(12) United States Patent
Tsai

(10) Patent No.: US 9,136,714 B2
(45) Date of Patent: Sep. 15, 2015

(54) METHOD AND APPARATUS FOR PERFORMING ACTIVE BALANCING CONTROL WITH AID OF VOLTAGE INFORMATION SHARING

(71) Applicant: Fu-Sheng Tsai, Taoyuan County (TW)

(72) Inventor: Fu-Sheng Tsai, Taoyuan County (TW)

(73) Assignee: Fu-Sheng Tsai, Taoyuan Dist., Taoyuan (TW)

( * ) Notice: Subject to any disclaimer, the term of this patent is extended or adjusted under 35 U.S.C. 154(b) by 176 days.

(21) Appl. No.: 13/939,202

(22) Filed: Jul. 11, 2013

(65) Prior Publication Data

US 2014/0015472 A1  Jan. 16, 2014

Related U.S. Application Data

(60) Provisional application No. 61/671,099, filed on Jul. 13, 2012.

(51) Int. Cl.
*H02J 7/00* (2006.01)
*G06F 17/50* (2006.01)

(52) U.S. Cl.
CPC ........... *H02J 7/0014* (2013.01); *G06F 17/5009* (2013.01); *H02J 7/0016* (2013.01); *H02J 7/0042* (2013.01); *G06F 2217/78* (2013.01)

(58) Field of Classification Search
CPC .... H02J 7/0014; H02J 7/007; Y02T 10/7055; Y02T 10/7005; Y02T 10/7061; Y02T 10/7011; H01M 10/441; H01M 10/4207; H01M 10/482; B06L 11/1866; B06L 2240/547
USPC ........................................ 320/103, 118, 134
See application file for complete search history.

(56) References Cited

U.S. PATENT DOCUMENTS 8,791,667 B2 * 7/2014 Kain ............................ 320/116
2012/0274283 A1 * 11/2012 van Lammeren ............ 320/118

* cited by examiner

*Primary Examiner* — Vuthe Siek
(74) *Attorney, Agent, or Firm* — Winston Hsu; Scott Margo

(57) ABSTRACT

A method for performing active balancing control with aid of voltage information sharing is provided. The method is applied to a power supply device. The method includes the steps of: obtaining first voltage information from a specific battery module of a set of battery modules connected in series within the power supply device, where each battery module includes at least one battery cell; obtaining second voltage information from at least one other battery module of the set of battery modules; and determining whether to enable at least one portion of an active balancing circuit of the specific battery module according to the first voltage information and the second voltage information. An associated apparatus is further provided.

18 Claims, 9 Drawing Sheets

METHOD AND APPARATUS FOR PERFORMING ACTIVE BALANCING CONTROL WITH AID OF VOLTAGE INFORMATION SHARING

CROSS REFERENCE TO RELATED APPLICATIONS

This application claims the benefit of U.S. provisional application No. 61/671,099, filed on Jul. 13, 2012, the contents of which are incorporated herein by reference.

BACKGROUND OF THE INVENTION

1. Field of the Invention

The disclosed embodiments of the present invention relate to a power supply device, and more particularly, to a method for performing active balancing control with aid of voltage information sharing and a related apparatus.

2. Description of the Prior Art

A conventional power supply device (e.g. a redundant power supply) usually includes a special purpose control circuit disposed therein in order to control operations of batteries within the conventional power supply device. In accordance with the related art, as the control circuit within the conventional power supply device requires a special design, certain problems may occur. For example, when output specifications of the conventional power supply device vary, the control circuit needs to be modified accordingly, resulting in an increase of related costs. In another example, as the design of the control circuit is updated in response to user requirements, mechanical elements within the conventional power supply device (e.g. cases) need to be modified accordingly, resulting in an increase of related costs. Thus, a novel method is needed to enhance the control of the power supply device without introducing undesirable side effects and improve the basic architecture of the power supply device.

SUMMARY OF THE INVENTION

It is therefore one objective of the present invention to provide a method for performing active balancing control with aid of voltage information sharing and a related apparatus to solve the above problems.

It is therefore another objective of the present invention to provide a method for performing active balancing control with aid of voltage information sharing and a related apparatus to realize automatic balancing between multiple battery modules without introducing undesirable side effects.

According to a preferred embodiment of the present invention, an exemplary method for performing active balancing control with aid of voltage information sharing is disclosed. The method is applied to a power supply device. The method comprises the following steps: obtaining first voltage information from a specific battery module of a set of battery modules connected in series within the power supply device, wherein each battery module comprises at least one battery cell; obtaining second voltage information from at least one other battery module of the set of battery modules; and determining whether to enable at least one portion of an active balancing circuit of the specific battery module according to the first voltage information and the second voltage information.

Besides the above method, an associated apparatus for performing active balancing control with aid of voltage information sharing is also provided correspondingly. The apparatus comprises at least one portion of a power supply device. Specifically, the apparatus comprises a specific battery module, an active balancing circuit, a voltage information sharing port and a determination circuit. The specific battery module is a battery module of a set of battery modules connected in series within the power supply device, wherein each battery module comprises at least one battery cell. The active balancing circuit is coupled to the specific battery module. The voltage information sharing port is disposed in a specific power supply module of a plurality of power supply modules of the power supply device, wherein the specific battery module is disposed in the specific power supply module. The determination circuit is coupled to the specific battery module, the active balancing circuit and the voltage information sharing port. The active balancing circuit is arranged for performing active balancing upon the specific battery module, and the voltage information sharing port is arranged for performing the voltage information sharing. Additionally, the determination circuit is arranged for obtaining first voltage information from the specific battery module, obtaining second voltage information from at least one other battery module of the set of battery modules through the voltage information sharing port, and determining whether to enable at least one portion of the active balancing circuit of the specific battery module according to the first voltage information and the second voltage information.

It is an advantage of the present invention that the method and apparatus for performing active balancing control with aid of voltage information sharing may realize automatic balancing between multiple battery modules without introducing undesirable side effects. In addition, the proposed method and apparatus are not limited by the number of the battery modules, and may realize self-balancing of a power supply device having multiple battery modules. Thus, a power supply device implemented according to the proposed method and apparatus may provide very high output voltages, and the problem of a severely shortened life in a weaker battery module will not occur. The proposed method and apparatus are beneficial for manufacturing, testing, installation, usage, servicing (e.g. replacing failed battery module(s)) and/or flexibility promotion (e.g. changing output specifications by adding or removing at least one battery module) of the power supply device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
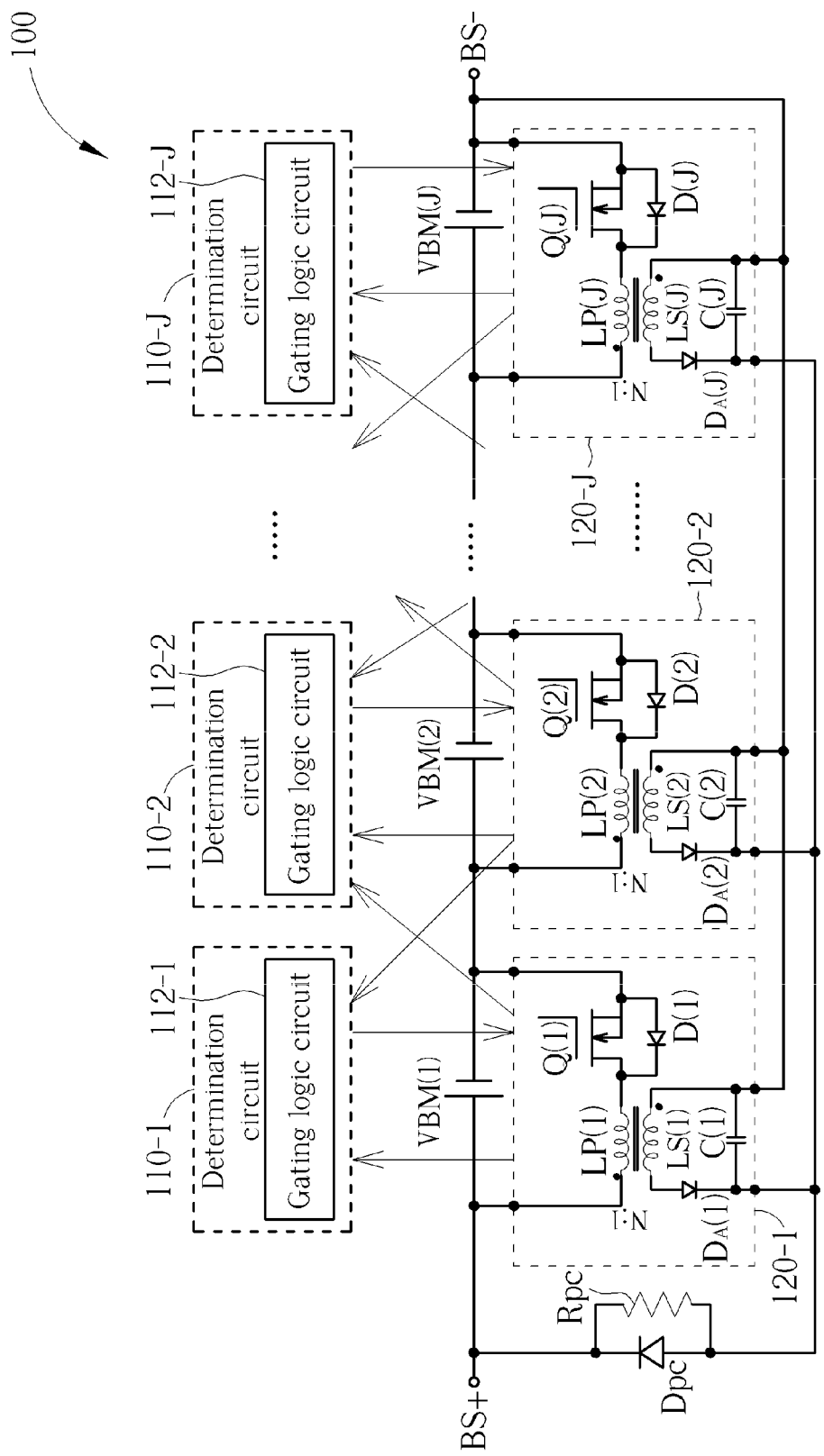
FIG. 1 is a diagram illustrating an exemplary apparatus for performing active balancing control with aid of voltage information sharing according to a first embodiment of the present invention.

FIG. 1 is a diagram illustrating an exemplary apparatus 100 for performing active balancing control with aid of voltage information sharing according to a first embodiment of the present invention. The apparatus 100 may include at least one portion (e.g. a portion or all) of a power supply device, wherein the power supply device may be, for example but not limited to, a redundant power supply. In one example, the apparatus 100 may represent an electrical system within the power supply device, and the electrical system may include at least one control circuit of the power supply device. In another example, the apparatus 100 may represent the whole power supply device. This is for illustrative purposes only, and is not meant to be a limitation of the present invention. According to a variation of the embodiment, the apparatus 100 may represent all parts of the electrical system excluding batteries (e.g. the aforementioned at least one control circuit). According to another variation of the embodiment, the apparatus 100 may represent a system including the power supply device, wherein the power supply device is a sub-system of the system.

As shown in FIG. 1, the apparatus 100 may include a set of battery modules {VBM(1), VBM(2), ..., VBM(J)} connected in series, wherein external terminals BS+ and BS− of the whole of the set of battery modules {VBM(1), VBM(2), ..., VBM(J)} may be regarded as a positive terminal and a negative terminal of a whole battery system formed with the set of battery modules {VBM(1), VBM(2), ..., VBM(J)}. Each battery module (e.g. the battery module VBM(i)) may include at least one battery cell (e.g. one or more than one battery cells) (not shown in FIG. 1), and the index i may be an integer in the interval [1, J]. Additionally, the apparatus 100 may include at least one determination circuit (e.g. a plurality of determination circuits {110-1, 110-2, ..., 110-J} corresponding to the set of the battery modules {VBM(1), VBM(2), ..., VBM(J)}, respectively), and further include a plurality of active balancing circuits {120-1, 120-2, ..., 120-J} (corresponding to the set of the battery modules {VBM(1), VBM(2), ..., VBM(J)}, respectively), a plurality of voltage information sharing ports (corresponding to the set of the battery modules {VBM(1), VBM(2), ..., VBM(J)}, respectively), and a diode Dpc and a resistor Rpc connected in parallel, wherein each voltage information sharing port includes a plurality of terminals such as terminals {ABd, BSc, VHi, VHo, VLi, VLo} (not shown in FIG. 1). The active balancing circuits {120-1, 120-2, ..., 120-J} are coupled to the set of battery modules {VBM(1), VBM(2), ..., VBM(J)}, respectively, and the voltage information ports are disposed in a plurality of power supply modules {M(1), M(2), ..., M(J)} (not labeled in FIG. 1) within the power supply device, respectively. The determination circuits {110-1, 110-2, ..., 110-J} are coupled to the set of battery modules {VBM(1), VBM(2), ..., VBM(J)}, the active balancing circuits {120-1, 120-2, ..., 120-j} and the voltage information sharing ports. Specifically, each of the determination circuits {110-1, 110-2, ..., 110-j} (e.g. the determination circuit 110-i) may include a gating logic circuit 112-i. Each of the active balancing circuits {120-1, 120-2, ..., 120-j} (e.g. the active balancing circuit 120-i) may include a plurality of windings LP(i) and LS(i) (which correspond to a primary side and a secondary side, respectively), and further include a switch (e.g. a metal-oxide-semiconductor field-effect transistor (MOSFET) Q(i)), a diode D(i) connected in series with the switch, a energy temporary storage unit (e.g. at least one capacitor C(i)) and another diode $D_A(i)$, wherein the energy temporary storage unit is coupled to the winding LS(i) corresponding to the secondary side, and the index i may be an integer in the interval [1, J]. As shown in FIG. 1, two terminals of the capacitor C(i) are coupled to two terminals of the winding LS(i) corresponding to the secondary side, respectively. In this embodiment, a turn ratio of the secondary side to the primary side (i.e. the turn ratio of the winding LS(i) to the winding LP(i)) may equal N:1, wherein the symbol "N" may be a constant value. This is for illustrative purposes only, and is not meant to be a limitation of the present invention. According to variations of the present invention, the turn ratio may be varied, wherein the constant value "N" may be replaced by other constant value (usually a positive integer). For example, the turn ratio may be varied in response to design objectives or requirements of the power supply device. In this embodiment, the capacitor C(i) is an example of the energy temporary storage unit. This is for illustrative purposes only, and is not meant to be a limitation of the present invention. According to variations of the present invention, the architecture of the energy temporary storage unit may be varied. In one example, the energy temporary storage unit may include a plurality of capacitors {C(i)}. In another example, the energy temporary storage unit may include one or more than one inductors. In yet another example, the energy temporary storage unit may include at least one capacitor C(i) and/or at least one inductor.

In practice, specifications of a transformer including the windings LP(i) and LS(i) and specifications of other devices in the active balancing circuit 120-i (e.g. the MOSFET Q(i), the capacitor C(i), the diode D(i) and the another diode $D_A(i)$) may be determined according to individual withstand voltages/currents. Similarly, specifications of the diode Dpc and the resistor Rpc may be determined according to individual withstand voltages/currents. For example, the specifications of the diode Dpc may be "3 A, 600V", and the specifications of the resistor Rpc may be "200K, 2 W", wherein the symbols "A", "V" and "W" denote ampere, volt and watt, and the symbol "K" denotes $10^3$, especially $10^3$ ohms.

In this embodiment, the active balancing circuit 120-i may perform active balancing for the battery module VBM(i), and the voltage information port corresponding to the battery module VBM(i) may be used to perform the voltage information sharing. Specifically, the voltage information ports corresponding to the battery modules {VBM(1), VBM(2), ..., VBM(J)} may be used to perform voltage information sharing between different battery modules in the battery modules {VBM(1), VBM(2), ..., VBM(J)}, wherein the voltage information sharing may be indicated by at least one portion of arrows between the determination circuits {110-1, 110-2, ..., 110-J} and the active balancing circuits {120-1, 120-2, ..., 120-J} shown in FIG. 1. Hence, the at least one determination circuit (e.g. the determination circuits {110-1, 110-2, ..., 110-J} may perform related control (e.g. the active balancing control) properly.

In practice, the resistor Rpc may be used to conduct a pre-charge path of the architecture shown in FIG. 1. In a case where the set of battery modules {VBM(1), VBM(2), ..., VBM(J)} has been disposed in the architecture shown in FIG. 1, when the resistor Rpc is disposed in the architecture shown in FIG. 1, the resistor Rpc may pre-charge the capacitors {C(i)} by a total output voltage of the set of battery modules {VBM(1), VBM(2), ..., VBM(J)}. Hence, the architecture shown in FIG. 1 may respond to active balancing operations promptly. Additionally, during the active balancing operations, the energy temporary storage unit (e.g. the at least one capacitor C(i)) may be used to temporarily store energy extracted from the battery module VBM(i), wherein the diode Dpc may be used to transmit the energy (temporarily stored in the energy temporary storage unit (e.g. the at least one capacitor C(i))) to the whole of the set of battery modules {VBM(1), VBM(2), ..., VBM(J)}.

Figure 2:
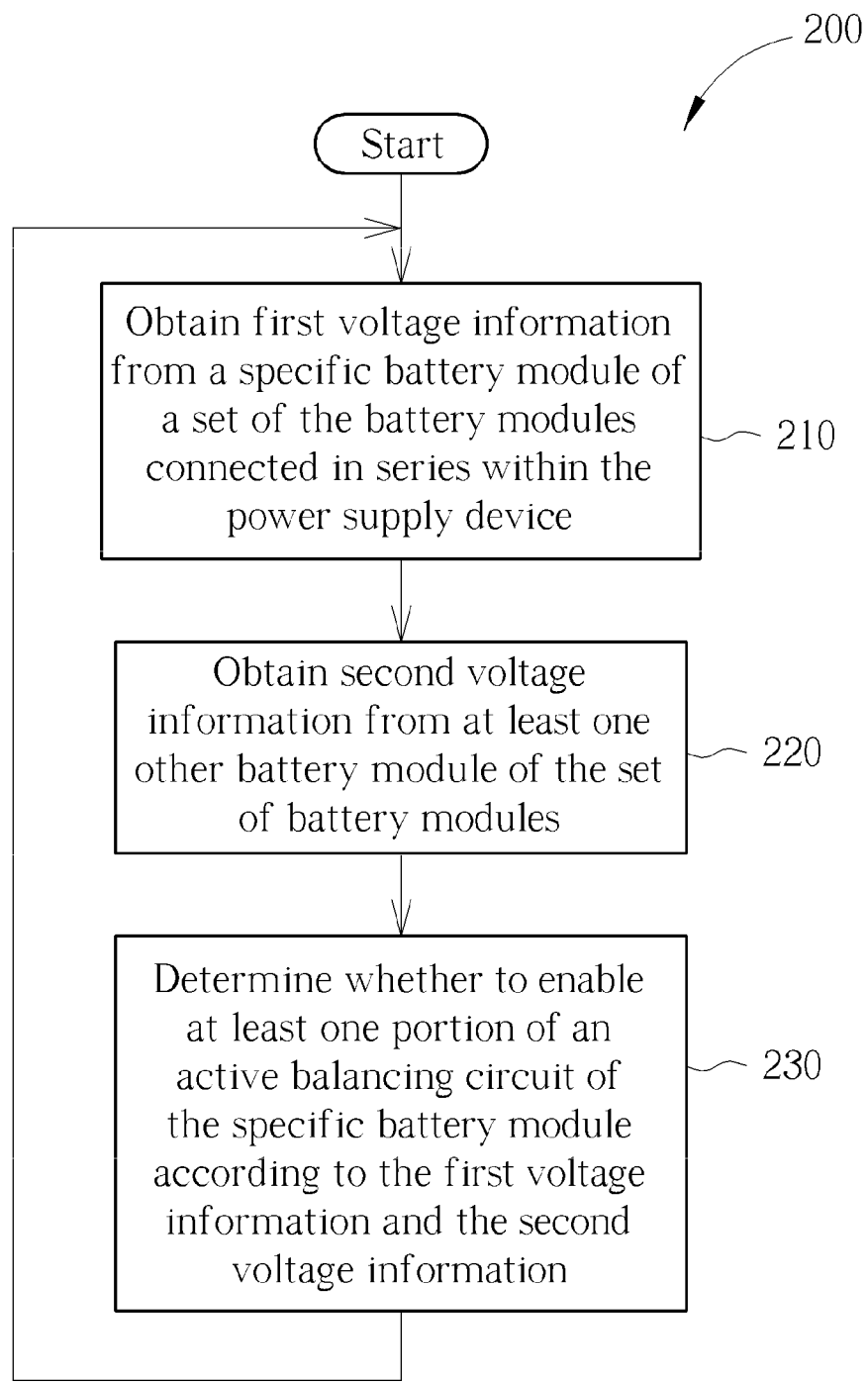
FIG. 2 is a flowchart illustrating an exemplary method for performing active balancing control with aid of voltage information sharing according to an embodiment of the present invention.

FIG. 2 is a flowchart illustrating an exemplary method 200 for performing active balancing control with aid of voltage information sharing according to an embodiment of the present invention. The method 200 may be applied to the apparatus 100 shown in FIG. 1, especially the determination circuits {110-1, 110-2, ..., 110-J} shown in FIG. 1. The method 200 is described below.

In step 210, the determination circuit 110-i obtains first voltage information from a specific battery module of the set of the battery modules {VBM(1), VBM(2), ..., VBM(J)} within the power supply device (e.g. the battery module VBM (i)).

In step 220, the determination circuit 110-i obtains second voltage information from at least one other battery module of the set of battery modules {VBM(1), VBM(2), ..., VBM(J)} (specifically at least one battery module of the set of battery modules {VBM(1), VBM(2), ..., VBM(J)} except for the battery module VBM(i)) through the voltage information sharing port corresponding to the battery module VBM(i).

In step 230, the determination circuit 110-i determines whether to enable at least one portion of an active balancing circuit of the specific battery module (e.g. at least one portion (a portion or all) of the active balancing circuit 120-i corresponding to the battery module VBM(i)) according to the first voltage information and the second voltage information.

In this embodiment, each of the power supply modules {M(1), M(2), ..., M(J)} (e.g. the power supply module M(i)) may include at least one voltage information sharing port, wherein battery modules of the set of battery modules {VBM (1), VBM(2), ..., VBM(J)} may be disposed in the power supply modules {M(1), M(2), ..., M(J)}, respectively. For example, the voltage information sharing port of the power supply module M(i) may include the terminals {ABd, BSc, VHi, VHo, VLi, VLo}, and the determination circuit 110-i may use the voltage information sharing port corresponding to the specific battery module (specifically the voltage information sharing port of the power supply module M(i)) and the voltage information sharing port corresponding to the at least one other battery module (specifically the voltage information sharing port of at least one power supply module of the power supply modules {M(1), M(2), ..., M(J)} except for the power supply module M(i)) to perform the voltage information sharing in order to perform the active balancing control.

In practice, each of the aforementioned power supply modules (e.g. the power supply module M(i)) may be implemented as a battery pack. Hence, each battery module of the set of battery modules {VBM(1), VBM(2), ..., VBM(J)} may be regarded as a module having independent architecture.

Figure 3:
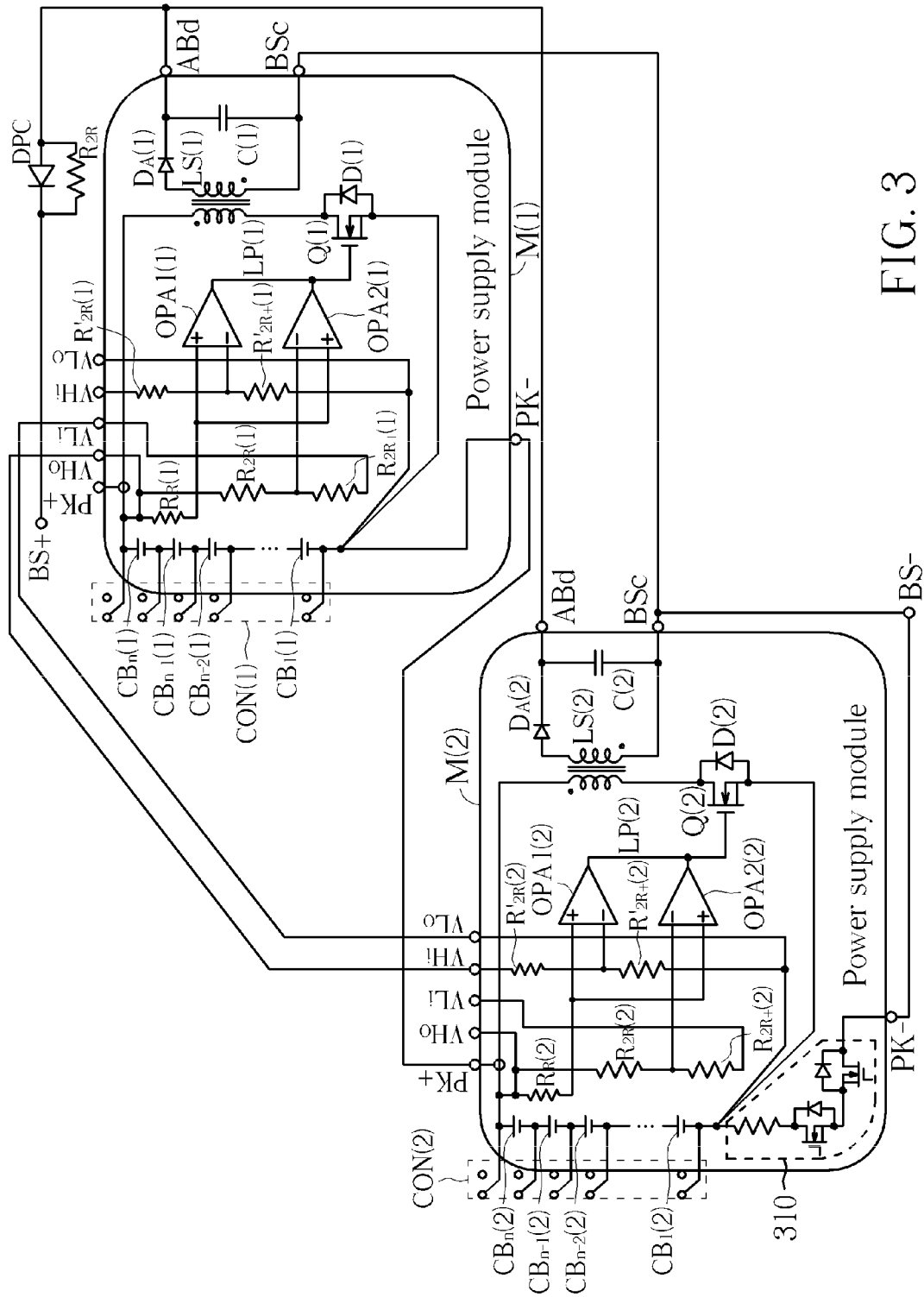
FIG. 3 is a diagram illustrating details of an embodiment of the method shown in FIG. 2.

To facilitate understanding of technical features of the present invention, please refer to FIG. 3. FIG. 3 is a diagram illustrating details of an embodiment of the method 200 shown in FIG. 2. In a case where the index J equals 2, the power supply modules {M(1), M(2), ..., M(J)} includes two power supply modules {M(1), M(2)}. This is for illustrative purposes only, and is not meant to be a limitation of the present invention. According to variations of the this embodiment, the number of the power supply modules {M(1), M(2), ..., M(J)} (i.e. the index J) may be varied.

As shown in FIG. 3, each battery module (e.g. the battery module VBM(i)) may include a set of battery cells {$CB_n(i)$, $CB_{n-1}(i)$, $CB_{n-2}(i)$, ..., $CB_1(i)$}. External terminals PK+ and PK− of the whole of the set of battery cells {$CB_n(i)$, $CB_{n-1}(i)$, $CB_{n-2}(i)$, ..., $CB_1(i)$} may be regarded as a positive terminal and a negative terminal of the whole of the power supply module M(i), which includes the set of battery cells {$CB_n(i)$, $CB_{n-1}(i)$, $CB_{n-2}(i)$, ..., $CB_1(i)$}. Each determination circuit (e.g. the determination circuit 110-i (especially the gating logic circuit 112-i included therein)) may include at least one comparator (e.g. a set of operational amplifiers (OP-AMP or OPAMP) {$OPA1(i)$, $OPA2(i)$}) and a plurality of resistors {$R_R(i)$, $R_{2R}(i)$, $R_{2R+}(i)$, $R'_{2R}(i)$, $R'_{2R+}(i)$}, wherein the resistors {$R_R(i)$, $R_{2R}(i)$, $R_{2R+}(i)$, $R'_{2R}(i)$, $R'_{2R+}(i)$} are coupled to the voltage information sharing port of the power supply module M(i), and the at least one comparator (e.g. the set of OP-AMPs {$OPA1(i)$, $OPA2(i)$}) are coupled to the resistors {$R_R(i)$, $R_{2R}(i)$, $R_{2R+}(i)$, $R'_{2R}(i)$, $R'_{2R+}(i)$} and the active balancing 120-i. The index i may be an integer in the interval [1, J]. Specifically, resistance values of the resistors {$R_R(i)$, $R_{2R}(i)$, $R_{2R+}(i)$, $R'_{2R}(i)$, $R'_{2R+}(i)$} may equal {R, 2R, 2R+, 2R, 2R+}, wherein the resistance value 2R+ is slightly greater than the resistance value 2R. This is for illustrative purposes only, and is not meant to be a limitation of the present invention. According to variations of this embodiment, the architecture formed with the set of OP-AMPs {$OPA1(i)$, $OPA2(i)$} and the resistors {$R_R(i)$, $R_{2R}(i)$, $R_{2R+}(i)$, $R'_{2R}(i)$, $R'_{2R+}(i)$} may be varied in response to determination criteria of the determination circuit 110-i. For example, the number of the set of OP-AMPs {$OPA1(i)$, $OPA2(i)$} may be varied. In another example, resistance values of at least one portion of the resistors {$R_R(i)$, $R_{2R}(i)$, $R_{2R+}(i)$, $R'_{2R}(i)$, $R'_{2R+}(i)$} may be adjusted. In yet another example, additional resistor(s) may be disposed in the determination circuit 110-i.

In this embodiment, the resistors {$R_R(i)$, $R_{2R}(i)$, $R_{2R+}(i)$, $R'_{2R}(i)$, $R'_{2R+}(i)$} may be used to obtain first voltage division information and second voltage division information from the first voltage information and the second voltage information, respectively. The at least one comparator (e.g. the set of OP-AMPs {$OPA1(i)$, $OPA2(i)$}) may be used to compare the first voltage division information with the second voltage division information to generate at least one comparison result. Hence, the determination circuit 110-i may use the at least one comparison result to control the at least one portion of the active balancing circuit 120-i in order to selectively enable the at least one portion of the active balancing circuit 120-i.

Additionally, each power supply module M(i) of the power supply modules {M(1), M(2), ..., M(J)} (e.g. any one of the power supply modules M(1) and M(2)) may include a plurality of terminals such as the terminals {ABd, BSc, VHi, VHo, VLi, VLo} within the voltage information port of the power supply module M(i) and certain terminals CON(i), wherein the certain terminals CON(i) may be electrically connected to certain control circuits of the set of the battery cells {$CB_n(i)$, $CB_{n-1}(i)$, $CB_{n-2}(i)$, ..., $CB_1(i)$}. For example, the certain terminals CON(i) may be electrically connected to external battery cell balancing circuits of the set of the battery cells {$CB_n(i)$, $CB_{n-1}(i)$, $CB_{n-2}(i)$, ..., $CB_1(i)$}. This is for illustrative purposes only, and is not meant to be a limitation of the present invention.

The voltage information sharing port corresponding to the specific battery module (e.g. the voltage information sharing port of the power supply module M(1)) is coupled to the voltage information sharing port corresponding to the at least one other battery module (e.g. the voltage information sharing port of the power supply module M(2)), thus allowing the determination circuit 110-*i* (e.g. the determination circuit 110-1) to obtain the second voltage information from the at least one other battery module (e.g. the power supply module M(2)) and allowing the specific battery module (e.g. the power supply module M(1)) to provide the first voltage information for the at least one other battery module (e.g. the power supply module M(2)), wherein the first voltage information is used to determine whether to enable at least one portion of at least one other active balancing circuit corresponding to the at least one other battery module (e.g. a portion or all of the active balancing circuit 120-2). In view of the above, the proposed method may further include the following steps: coupling the voltage information sharing port corresponding to the specific battery module (e.g. the voltage information sharing port of the power supply module M(1)) to the voltage information sharing port corresponding to the at least one other battery module (e.g. the voltage information sharing port of the power supply module M(2)), thus allowing the determination circuit 110-*i* (e.g. the determination circuit 110-1) to obtain the second voltage information from the at least one other battery module (e.g. the power supply module M(2)) and allowing the specific battery module (e.g. the power supply module M(1)) to provide the first voltage information for the at least one other battery module (e.g. the power supply module M(2)), wherein the first voltage information is used to determine whether to enable at least one portion of at least one other active balancing circuit corresponding to the at least one other battery module (e.g. a portion or all of the active balancing circuit 120-2).

According to embodiments of the present invention (e.g. the embodiment shown in FIG. 2 and variations thereof such as the embodiment shown in FIG. 3), the meanings of the terminals {ABd, BSc, VHi, VHo, VLi, VLo} of the power supply module M(*i*) may be described below.

VHo: a voltage information output terminal. The terminal VHo may be used to output voltage information of the terminal PK+ of the power supply module M(*i*) to the next power supply module M(*i*+1) (if present), which is connected in series with the power supply module M(*i*) and has a lower voltage. The power supply module M(*i*+1) may be a battery pack having a lower voltage. For example, the terminal VHo of the power supply module M(1) may be used to output the voltage information of the terminal PK+ of the power supply module M(1) to the next power supply module M(2) having a lower voltage.

VLo: a voltage information output terminal. The terminal VLo may be used to output voltage information of the terminal PK− of the power supply module M(*i*) to the previous power supply module M(*i*−1) (if present), which is connected in series with the power supply module M(*i*) and has a higher voltage. The power supply module M(*i*−1) may be a battery pack having a higher voltage. For example, the terminal VLo of the power supply module M(2) may be used to output the voltage information of the terminal PK− of the power supply module M(2) to the previous power supply module M(1) having a higher voltage.

VHi: a voltage information input terminal, which may be used to receive voltage information of the terminal PK+ of the previous power supply module M(*i*−1) having a higher voltage (if present). For example, the terminal VHi of the power supply module M(2) may be used to receive voltage information of the terminal PK+ of the previous power supply module M(1) having a higher voltage.

VLi: a voltage information input terminal, which may be used to receive voltage information of the terminal PK− of the next power supply module M(*i*+1) having a lower voltage (if present). For example, the terminal VLi of the power supply module M(1) may be used to receive voltage information of the terminal PK− of the next power supply module M(2) having a lower voltage.

ABd: a voltage information input/output terminal, which may be used to share voltage information of the diode $D_A(i)$ within the active balancing circuit 120-*i* with other power supply module(s). For example, the terminal ABd of the power supply module M(1) may be used to share voltage information of the diode $D_A(\mathbf{1})$ within the active balancing circuit 120-1 with other power supply module(s) such as the power supply module M(2). In another example, the terminal ABd of the power supply module M(2) may be used to share voltage information of the diode $D_A(\mathbf{2})$ within the active balancing circuit 120-2 with other power supply module(s) such as the power supply module M(1).

BSc: a battery system common terminal, which may be used as a common ground.

According to embodiments of the present invention (e.g. the embodiment shown in FIG. 2 and variations thereof such as the embodiment shown in FIG. 3), the determination circuit 110-*i* may control temporary storage operations of the energy temporary storage unit. Specifically, the determination circuit 110-*i* may selectively enable the at least one portion of the active balancing circuit 120-*i* according to the first voltage information and the second voltage information in order to allow energy to be transmitted from the specific battery module (e.g. specific battery module VBM(i)) to the energy temporary storage unit (e.g. the at least one capacitor C(i)) through the primary side and the secondary side.

In practice, two terminals of the energy temporary storage unit (e.g. the capacitor C(i)) are coupled to two external terminals BS+ and BS− of the whole of the set of battery modules {VBM(1), VBM(2), . . . , VBM(J)}, respectively, in order to allow the energy temporary storage unit to distribute the energy temporarily stored in the energy temporary storage unit to the whole of the set of battery modules {VBM(1), VBM(2), . . . , VBM(J)}. Specifically, the active balancing circuits {120-1, 120-2, . . . , 120-J} of the set of battery modules {VBM(1), VBM(2), . . . , VBM(J)} may include individual energy temporary storage units (e.g. the capacitors {C(1), C(2), . . . , C(J)}), wherein the energy temporary storage units are connected in parallel. Hence, the determination circuit 110-*i* may selectively enable the active balancing circuit 120-*i* according to the first voltage information and the second voltage information in order to allow energy to be transmitted from the specific battery module (e.g. the battery module VBM(i)) to the energy temporary storage units (e.g. the capacitors {C(1), C(2), . . . , C(J)}) through the primary side and the secondary side. Two terminals of each energy temporary storage unit are coupled to the external terminals BS+ and BS− of the whole of the set of battery modules {VBM(1), VBM(2), . . . , VBM(J)}, respectively, in order to allow the energy temporary storage units to distribute energy temporarily stored in the energy temporary storage units to the whole of the set of battery modules {VBM(1), VBM(2), . . . , VBM(J)}. In view of the above, the proposed method may further include the following step: coupling two terminals of the energy temporary storage unit (e.g. the capacitor C(i)) to two external terminals BS+ and BS− of the whole of the set of battery modules {VBM(1), VBM(2), . . . , VBM(J)}, respectively, in order to allow the energy temporary storage unit to distribute the energy temporarily stored in the energy temporary storage unit to the whole of the set of battery modules {VBM(1), VBM(2), . . . , VBM(J)}. Specifically, the proposed method may further include the following step: coupling two terminals of each energy temporary storage unit are coupled to the external terminals BS+ and BS− of the whole of the set of battery modules {VBM(1), VBM(2), . . . , VBM(J)}, respectively, in order to allow the energy temporary storage units to distribute energy temporarily stored in the energy temporary storage units to the whole of the set of battery modules {VBM(1), VBM(2), . . . , VBM(J)}.

The description of a switch control module 310 shown in FIG. 3 is provided below. The switch control module 310 may be disposed in the power supply module M(J) to perform switching control. In a case where the index J equals 2, the switch control module 310 may be disposed in the power supply module M(2), wherein the rest of the power supply modules {M(1), M(2), . . . , M(J)} (i.e. the power supply module M(1)) needs not have the switch control module 310 disposed therein. In another case where the index J equals 18, the switch control module 310 may be disposed in the power supply module M(18), wherein the disposition of the switch control module 310 in the power supply module M(18) is identical to that in the power supply module M(2) shown in FIG. 3. Additionally, the rest of the power supply modules {M(1), M(2), . . . , M(J)} (i.e. any one of the power supply modules {M(1), M(2), . . . , M(17)}) needs not have the switch control module 310 disposed therein. This is for illustrative purposes only, and is not meant to be a limitation of the present invention. According to embodiments of the present invention, such as variations of the embodiment shown in FIG. 3, the disposition of the switch control module 310 may be varied as long as the implementation of the present invention is not affected. In one example, according to a variation of the embodiment shown in FIG. 3, the switch control module 310 may be disposed outside the power supply module M(J). In another example, according to another variation of the embodiment shown in FIG. 3, the switch control module 310 may be disposed in each of the power supply modules {M(1), M(2), . . . , M(J)}, wherein two external terminals of the switch control module 310 disposed in each of the power supply modules {M(1), M(2), . . . , M(J−1)} may be short-circuited so that the switch control module 310 disposed in each of the power supply modules {M(1), M(2), . . . , M(J−1)} is disabled.

Figure 4:
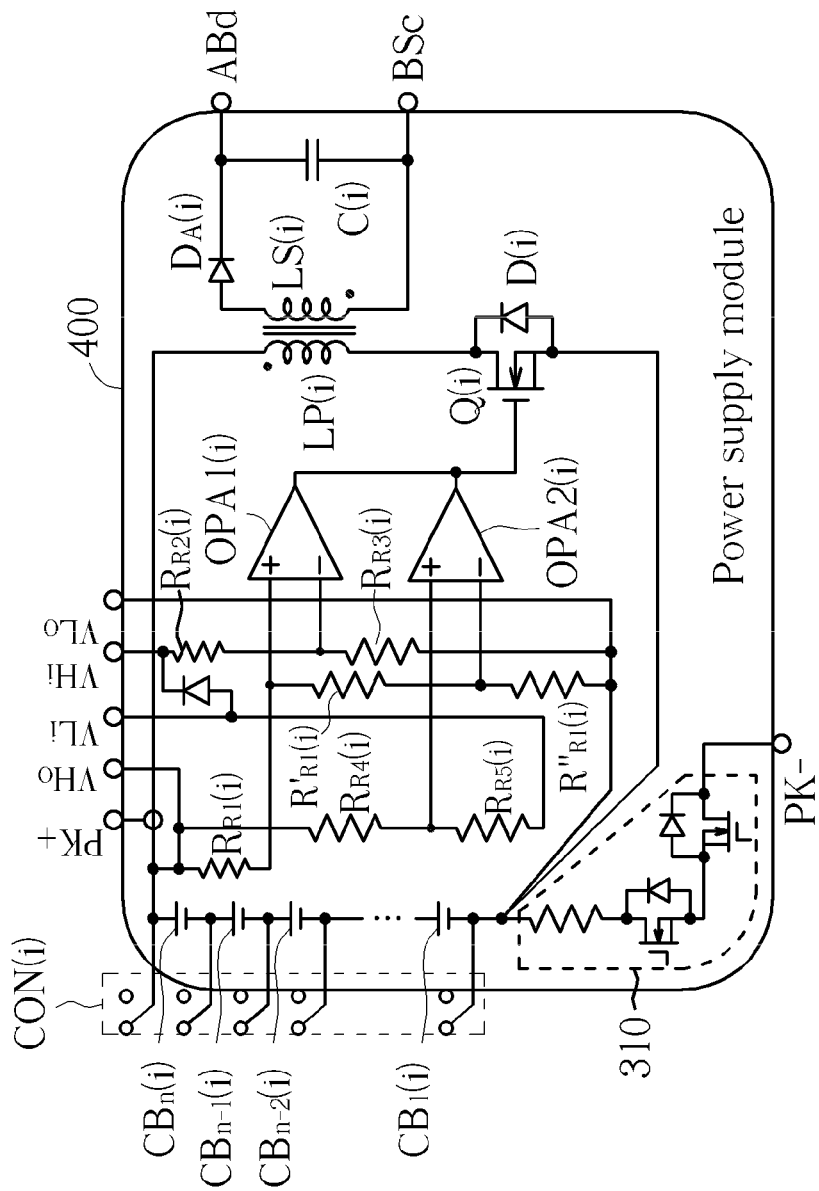
FIG. 4 is a diagram illustrating details of another embodiment of the method shown in FIG. 2.

FIG. 4 is a diagram illustrating details of another embodiment of the method 200 shown in FIG. 2 (e.g. details of the power supply module 400). The resistors {$R_R(i)$, $R_{2R}(i)$, $R_{2R+}(i)$, $R'_{2R}(i)$, $R'_{2R+}(i)$} shown in FIG. 3 may be replaced by a set of resistors {$R_{R1}(i)$, $R_{R2}(i)$, $R_{R3}(i)$, $R_{R4}(i)$, $R_{R5}(i)$, $R'_{R1}(i)$, $R''_{R1}(i)$}. In one example, resistance values of the resistors {$R_{R1}(i)$, $R_{R2}(i)$, $R_{R3}(i)$, $R_{R4}(i)$, $R_{R5}(i)$, $R'_{R1}(i)$, $R''_{R1}(i)$} may equal {R1, R2, R3, R4, R5, R1, R1}, respectively. This is for illustrative purposes only, and is not meant to be a limitation of the present invention. According to variations of this embodiment, the architecture formed with the set of OP-AMPs {OPA1(i), OPA2(i)} and the resistors {$R_{R1}(i)$, $R_{R2}(i)$, $R_{R3}(i)$, $R_{R4}(i)$, $R_{R5}(i)$, $R'_{R1}(i)$, $R''_{R1}(i)$} may be varied in response to the determination criteria of the determination circuit 110-i. For example, the number of the set of OP-AMPs {OPA1(i), OPA2(i)} may be varied. In another example, resistance values of at least one portion of the resistors {$R_{R1}(i)$, $R_{R2}(i)$, $R_{R3}(i)$, $R_{R4}(i)$, $R_{R5}(i)$, $R'_{R1}(i)$, $R''_{R1}(i)$} may be adjusted. In yet another example, additional resistor(s) may be disposed in the determination circuit 110-i.

The description of a switch control module 310 shown in FIG. 4 is provided below. The switch control module 310 may be selectively disposed in the power supply module M(J) to perform switching control. In a case where the index i equals the index J the switch control module 310 may be disposed in the power supply module 400 shown in FIG. 4, wherein the disposition of the switch control module 310 in the power supply module 400 is identical to that in the power supply module M(2) shown in FIG. 3. In another case where the index i is smaller than the index J, the switch control module 310 needs not be disposed in the power supply module 400, wherein the connection between the terminal below the battery cell $CB_1(i)$ and the external terminal PK− is identical to that within the power supply module M(1) shown in FIG. 3. For the sake of brevity, similar descriptions are not repeated here.

Figure 5:
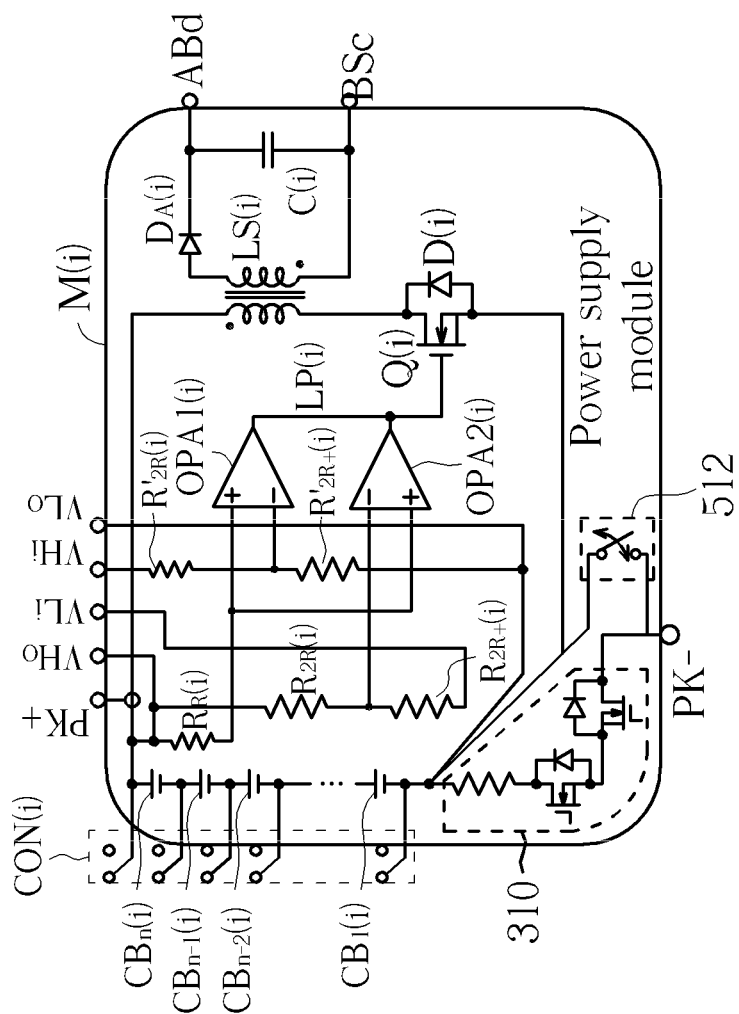
FIG. 5 is a diagram illustrating details of another embodiment of the method shown in FIG. 2.

FIG. 5 is a diagram illustrating details of another embodiment of the method 200 shown in FIG. 2 (e.g. details of the power supply module M(i)). In a case where the index i is smaller the index J two external terminals of the switch control module 310 of the power supply module M(i) in this embodiment may be short-circuited through the switch 512 so that the terminal below the battery cell $CB_1(i)$ is directly electrically connected to the external terminal PK−. Hence, in the case where the index i is smaller the index J, the switch control module 310 of the power supply module M(i) is disabled, and the power supply module M(1) shown in FIG. 3 may be regarded as an equivalent circuit of the power supply module M(i) shown in FIG. 5. In another case where the index i equals the index J, two external terminals of the switch control module 310 of the power supply module M(i) in this embodiment are not short-circuited through the switch 512 so that the switch control module 310 of the power supply module M(i) may perform switch control according to requirements. Hence, in the case where the index i equals the index J, the power supply module M(2) shown in FIG. 3 may be regarded as an equivalent circuit of the power supply module M(i) shown in FIG. 5. For the sake of brevity, similar descriptions are not repeated here.

In the embodiment shown in FIG. 5, the power supply module M(i) includes the switch 512. This is for illustrative purposes only, and is not meant to be a limitation of the present invention. According to a variation of the embodiment shown in FIG. 5, the switch 512 needs not be disposed. Specifically, in this variation, a jumper (not shown in FIG. 5) may be selectively used to replace the switch 512. In a case where the index i is smaller the index J, the two external terminals of the switch control module 310 within the power supply module M(i) in this variation may be short-circuited by use of the jumper so that the terminal below the battery cell $CB_1(i)$ is directly connected to the external PK−. Hence, In the case where the index i is smaller the index J, the switch control module 310 of the power supply module M(i) is disabled. In another case where the index i equals the index J, two external terminals of the switch control module 310 of the power supply module M(i) in this variation are not short-circuited by use of the jumper so that the switch control module 310 of the power supply module M(i) may perform switch control according to requirements.

Figure 6:
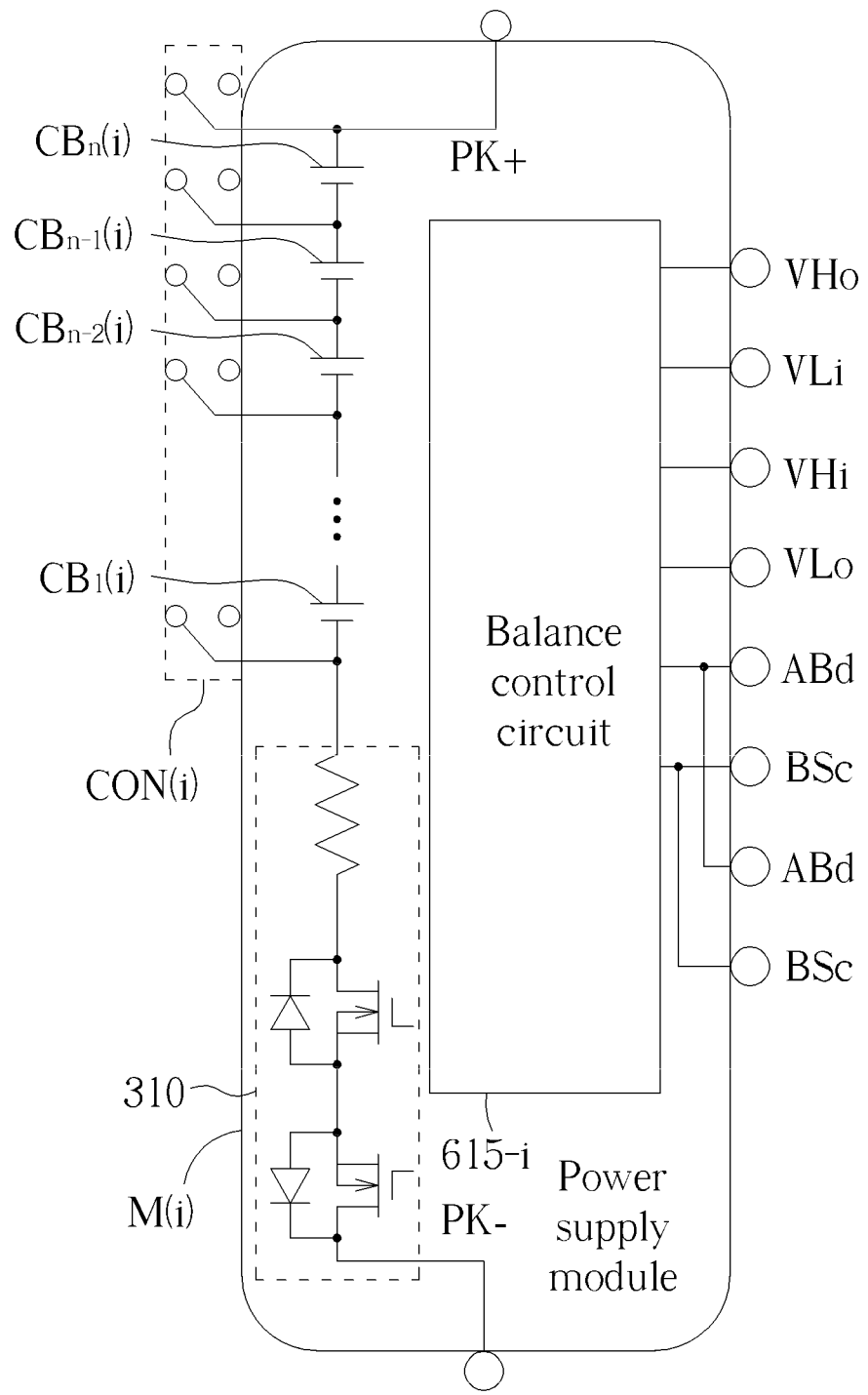
FIG. 6 is a diagram illustrating the power supply module shown in FIG. 5.

FIG. 6 is a diagram illustrating the power supply module M(i) shown in FIG. 5. A balance control circuit 615-i may include elements belonging to the determination circuit 110-i and elements belonging to the active balancing circuit 120-i within the power supply module M(i). For the sake of brevity, the switch 512 is not shown in FIG. 6, and similar descriptions are not repeated here.

Please note that FIG. 6 illustrates the switch control module 310. This is for illustrative purposes only, and is not meant to be a limitation of the present invention. According to variations of the embodiment shown in FIG. 6, the switch control module 310 may be selectively disposed in the power supply module M(i) shown in FIG. 6. In a case where the index i is smaller than the index J the power supply module M(i) in the variations needs not have the switch control module 310 disposed therein, wherein the terminal below the battery cell $CB_1(i)$ is directly connected to the external terminal PK−. In another case where the index i equals the index J, the power supply module M(i) in the variations may have the switch control module 310 disposed therein, wherein the disposition of the switch control module 310 is shown in FIG. 6.

Figure 7:
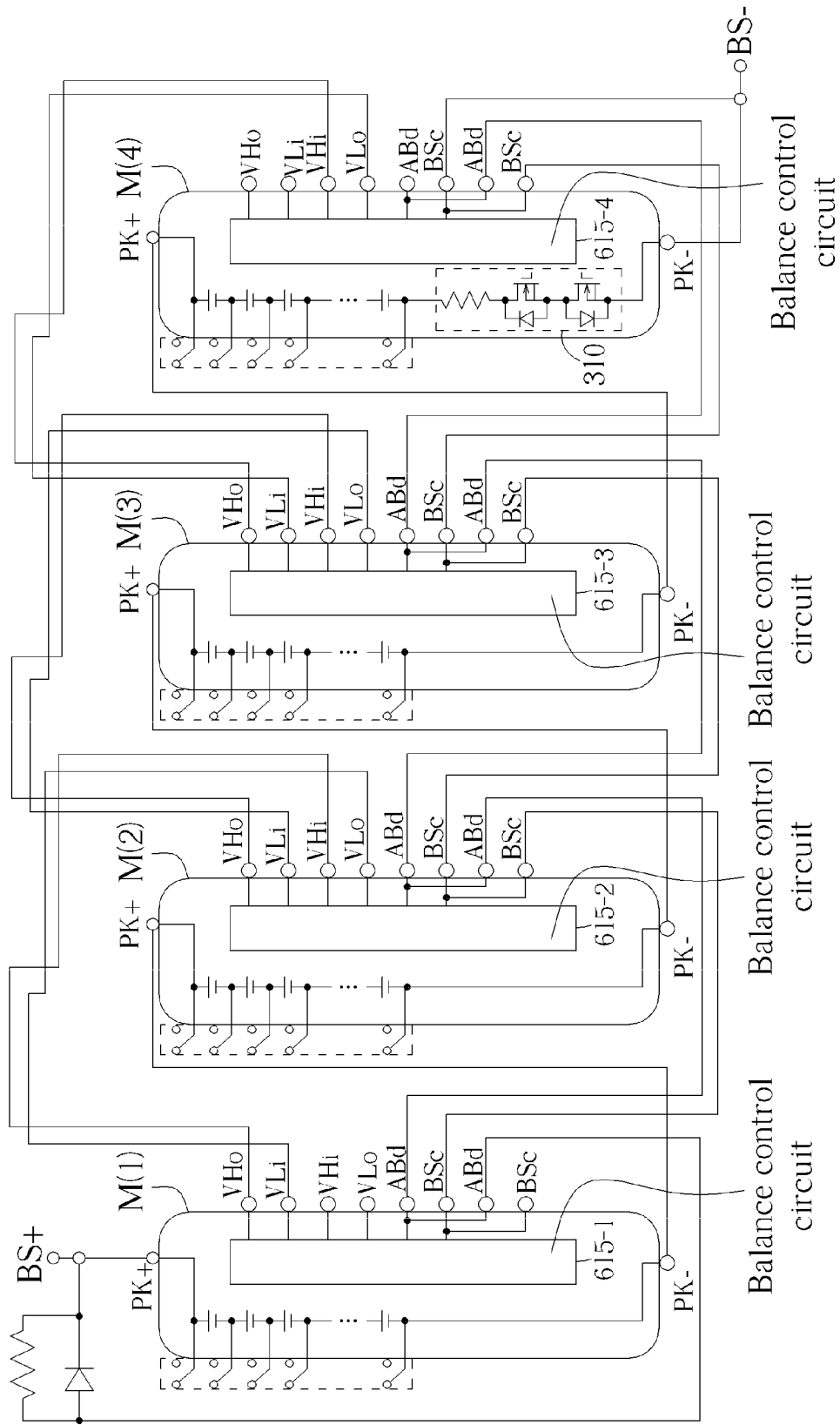
FIG. 7 is a diagram illustrating an exemplary connection between replicas of the power supply module shown in FIG. 6 according to an embodiment of the present invention.

FIG. 7 is a diagram illustrating an exemplary connection between replicas of the power supply module M(i) shown in FIG. 6 according to an embodiment of the present invention. For example, the replicas of the power supply module M(i) may include the power supply modules {M(1), M(2), M(3), M(4)}. For the sake of brevity, the switch 512 is not shown in FIG. 7, and the switch control module 310 is shown in the power supply module M(4) only. Similar descriptions are not repeated here.

Please note that FIG. 7 illustrates the switch control module 310. This is for illustrative purposes only, and is not meant to be a limitation of the present invention. According to variations of the embodiment shown in FIG. 7, the switch control module 310 may be selectively disposed in the power supply module M(J) (e.g. the power supply module M(4) shown in FIG. 7). In a case where the index i is smaller than the index J the power supply module M(i) in the variations (e.g. any one of the power supply modules {M(1), M(2), M(3)} shown in FIG. 7) needs not have the switch control module 310 disposed therein, wherein the terminal below the battery cell $CB_1(i)$ is directly connected to the external terminal PK−. In another case where the index i equals the index J the power supply module M(J) in the variations (e.g. the power supply module M(4) shown in FIG. 7) may have the switch control module 310 disposed therein, wherein the disposition of the switch control module 310 is shown in FIG. 7.

Figure 8:
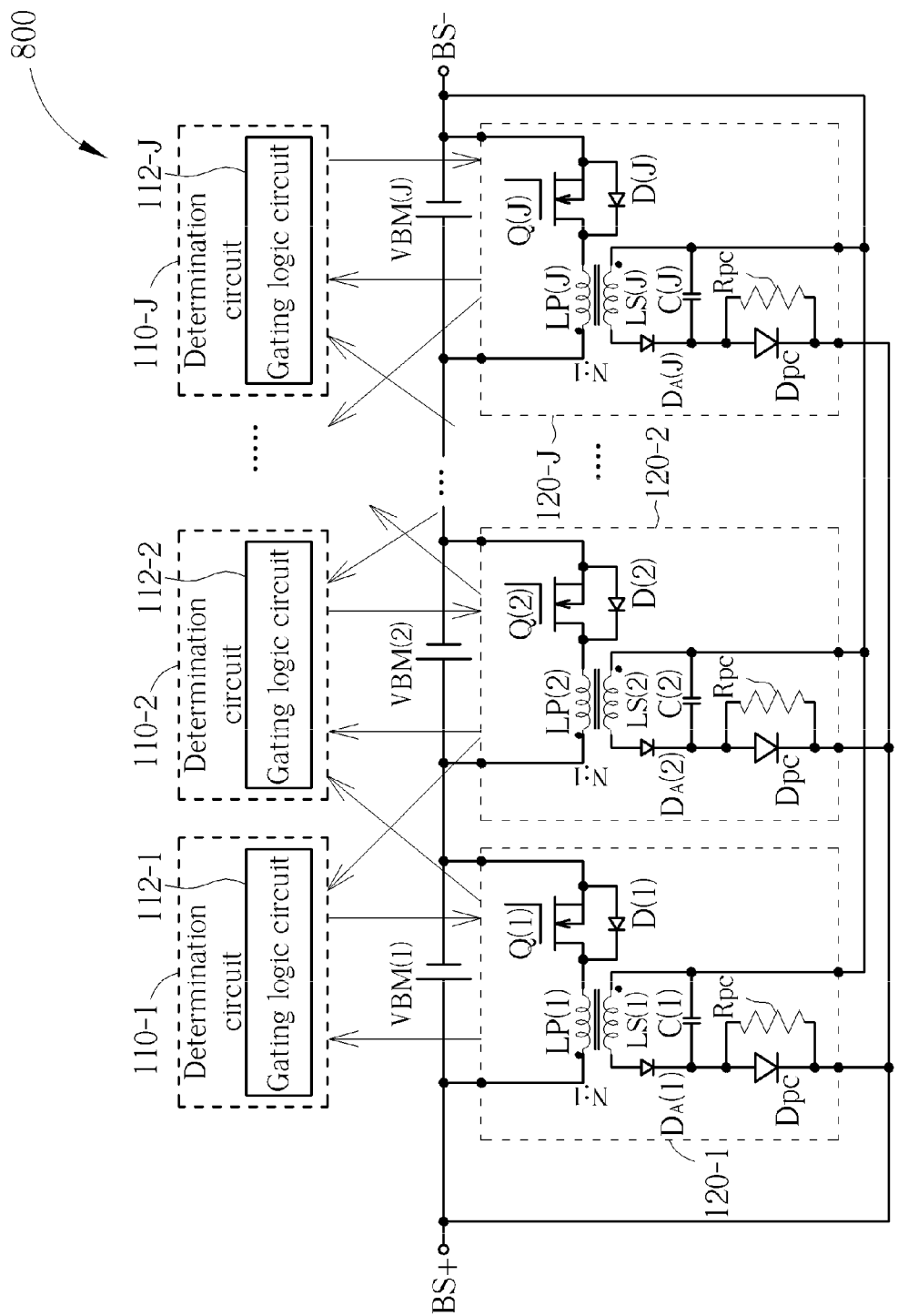
FIG. 8 is a diagram illustrating an apparatus for performing active balancing control with aid of voltage information sharing according to an embodiment of the present invention.

FIG. 8 is a diagram illustrating an apparatus 800 for performing active balancing control with aid of voltage information sharing according to an embodiment of the present invention. In contrast to the embodiment shown in FIG. 1, this embodiment disposes diodes {Dpc} and resistors {Rpc} dedicated to the active balancing circuits {120-1, 120-2, ..., 120-J} (especially the individual energy temporary storage units, such as the capacitors {C(1), C(2), ..., C(J)}, of the active balancing circuits {120-1, 120-2, ..., 120-J}). For the sake of brevity, similar descriptions are not repeated here.

Figure 9:
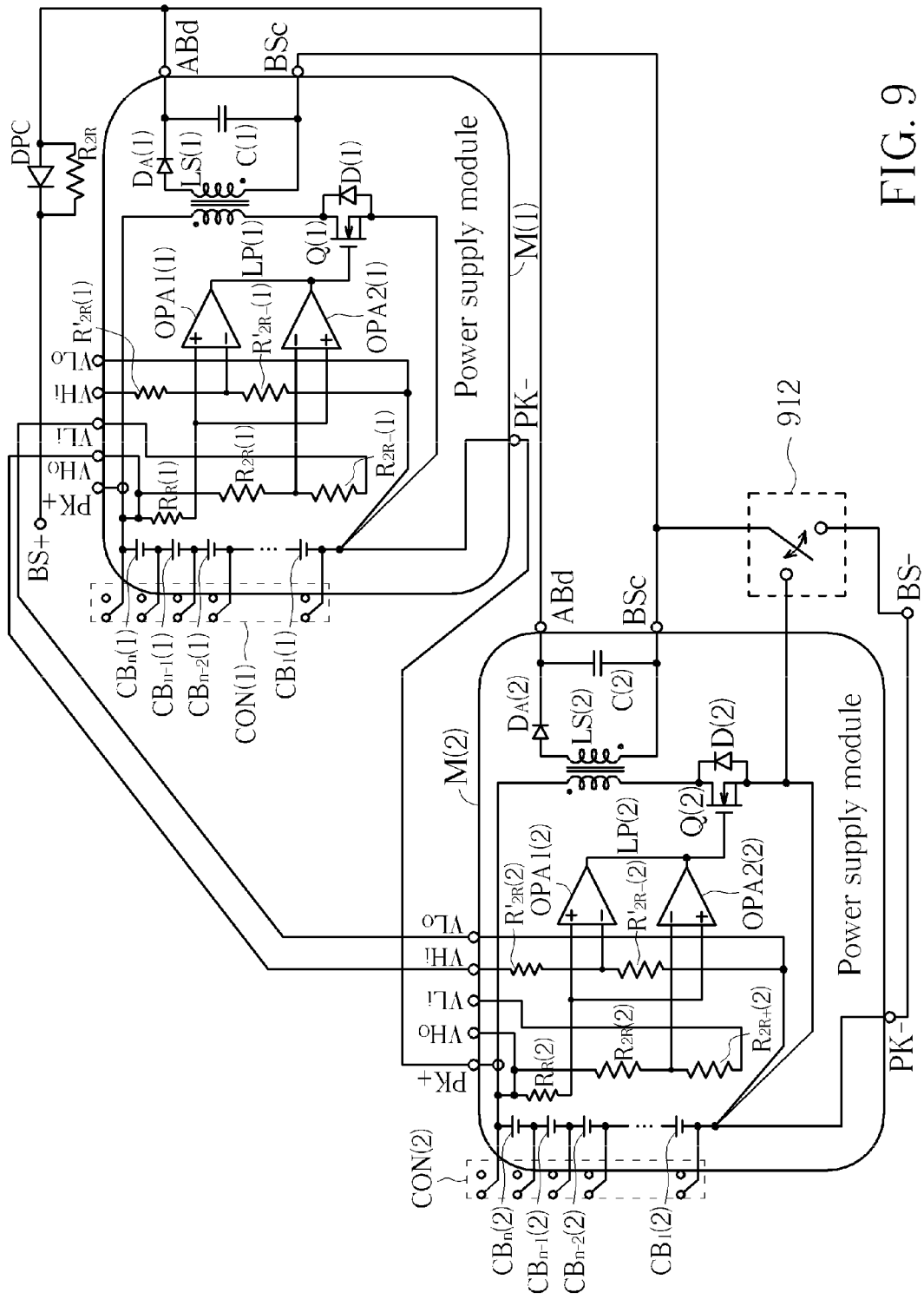
FIG. 9 is a diagram illustrating details of another embodiment of the method 200 shown in FIG. 2.

FIG. 9 is a diagram illustrating details of another embodiment of the method 200 shown in FIG. 2. In contrast to the embodiment shown in FIG. 3, each of the power supply modules {M(1), M(2), ..., M(J)} shown in this embodiment needs not have the switch control module 310 therein. Regarding any one of the power supply modules {M(1), M(2), ..., M(J)}, the connection between the terminal below the battery cell $CB_1(i)$ and the external terminal PK− is identical to that within the power supply module M(1) shown in FIG. 3. In addition, this embodiment disposes a switch 912 in the power supply module M(J) (e.g. the power supply module M(2) when the index J equals 2) in order to perform the aforementioned switch control, wherein the function of the switch 912 may replace that of the switch control module 310. For the sake of brevity, similar descriptions are not repeated here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing active balancing control with aid of voltage information sharing, the method being applied to a power supply device, the method comprising:
    obtaining first voltage information from a specific battery module of a set of battery modules connected in series within the power supply device, wherein each battery module comprises at least one battery cell;
    obtaining second voltage information from at least one other battery module of the set of battery modules; and
    utilizing a determination circuit to determine whether to enable at least one portion of an active balancing circuit of the specific battery module according to the first voltage information and the second voltage information;
    wherein the active balancing circuit comprises a plurality of windings and an energy temporary storage unit; the windings correspond to a primary side and a secondary side, respectively; the energy temporary storage unit is coupled to a winding corresponding to the secondary side, and is arranged for storing energy temporarily; and the method further comprises:
    selectively enabling the at least one portion of the active balancing circuit according to the first voltage information and the second voltage information in order to allow the energy to be transmitted from the specific battery module to the energy temporary storage unit of the active balancing circuit through the primary side and the secondary side.

2. The method claim 1, wherein each of a plurality of power supply modules of the power supply device comprises a voltage information sharing port; battery modules of the set of the battery modules are disposed in the power supply modules, respectively; and the method further comprises:
    using a voltage information sharing port corresponding to the specific battery module and a voltage information sharing port corresponding to the at least one other battery module to perform the voltage information sharing in order to perform the active balancing control.

3. The method of claim 2, wherein the step of obtaining the second voltage information from the at least one other battery module of the set of battery modules comprises:
    coupling the voltage information sharing port corresponding to the specific battery module to the voltage information sharing port corresponding to the at least one other battery module in order to obtain the second voltage information from the at least one other battery module.

4. The method of claim 2, further comprising:
    coupling the voltage information sharing port corresponding to the specific battery module to the voltage information sharing port corresponding to the at least one other battery module in order to provide the first voltage information for the at least one other battery module, and accordingly determining whether to enable at least one portion of at least one other active balancing circuit corresponding to the at least one other battery module.

5. The method of claim 1, further comprising:
    coupling two terminals of the energy temporary storage unit to two external terminals of the whole of the set of battery modules, respectively, in order to allow the energy temporary storage unit to distribute the energy temporarily stored in the energy temporary storage unit to the whole of the set of battery modules.

6. The method of claim 5, wherein active balancing circuits of the set of the battery modules comprise individual energy temporary storage units; the energy temporary storage units are connected in parallel; and the method further comprises:

selectively enabling the active balancing circuit according to the first voltage information and the second voltage information in order to allow energy to be transmitted from the specific battery module to the energy temporary storage units through the primary side and the secondary side; and coupling two terminals of each energy temporary storage unit to the external terminals of the whole of the set of battery modules, respectively, in order to allow the energy temporary storage units to distribute energy temporarily stored in the energy temporary storage units to the whole of the set of battery modules.

7. The method of claim 1, wherein the energy temporary storage unit comprises a capacitor, and two terminals of the capacitor are coupled to two terminals of a winding corresponding to the secondary side, respectively.

8. The method of claim 1, wherein the step of determining whether to enable the at least one portion of the active balancing circuit according to the first voltage information and the second voltage information comprises:

using a plurality of resistors to obtain first voltage division information and second voltage division information from the first voltage information and the second voltage information, respectively; and using at least one comparator to compare the first voltage division information with the second voltage division information to generate at least one comparison result; the method further comprises:

using the at least one comparison result to control the at least one portion of the active balancing circuit in order to selectively enable the at least one portion of the active balancing circuit.

9. The method of claim 1, wherein each battery module comprises a set of battery cells connected in series.

10. An apparatus for performing active balancing control with aid of voltage information sharing, the apparatus comprising at least one portion of a power supply device, the apparatus comprising:

a specific battery module, wherein the specific battery module is a battery module of a set of battery modules connected in series within the power supply device, and each battery module comprises at least one battery cell;

an active balancing circuit, coupled to the specific battery module, the active balancing circuit arranged for performing active balancing;

a voltage information sharing port, disposed in a specific power supply module of a plurality of power supply modules of the power supply device, the voltage information sharing port arranged for performing the voltage information sharing, wherein the specific battery module is disposed in the specific power supply module; and a determination circuit, coupled to the specific battery module, the active balancing circuit and the voltage information sharing port, the determination circuit arranged for obtaining first voltage information from the specific battery module, obtaining second voltage information from at least one other battery module of the set of battery modules through the voltage information sharing port, and determining whether to enable at least one portion of the active balancing circuit of the specific battery module according to the first voltage information and the second voltage information;

wherein the active balancing circuit comprises:

a plurality of windings, wherein the windings correspond to a primary side and a secondary side, respectively; and an energy temporary storage unit, coupled to a winding corresponding to the secondary side, the energy temporary storage unit arranged for storing energy temporarily;

wherein the determination circuit selectively enables the at least one portion of the active balancing circuit according to the first voltage information and the second voltage information in order to allow the energy to be transmitted from the specific battery module to the energy temporary storage unit through the primary side and the secondary side.

11. The apparatus claim 10, wherein each of the power supply modules of the power supply device comprises a voltage information sharing port; battery modules of the set of the battery modules are disposed in the power supply modules, respectively; and the determination circuit uses the voltage information sharing port corresponding to the specific battery module and the voltage information sharing port corresponding to the at least one other battery module to perform the voltage information sharing in order to perform the active balancing control.

12. The apparatus of claim 11, wherein the voltage information sharing port corresponding to the specific battery module is coupled to the voltage information sharing port corresponding to the at least one other battery module in order to allow the determination circuit to obtain the second voltage information from the at least one other battery module.

13. The apparatus of claim 11, wherein the voltage information sharing port corresponding to the specific battery module is coupled to the voltage information sharing port corresponding to the at least one other battery module in order to allow the specific battery module to provide the first voltage information for the at least one other battery module, and the first voltage information is used to determine whether to enable at least one portion of at least one other active balancing circuit corresponding to the at least one other battery module.

14. The apparatus of claim 10, wherein two terminals of the energy temporary storage unit are coupled to two external terminals of the whole of the set of battery modules, respectively, in order to allow the energy temporary storage unit to distribute the energy temporarily stored in the energy temporary storage unit to the whole of the set of battery modules.

15. The apparatus of claim 14, wherein active balancing circuits of the set of the battery modules comprise individual energy temporary storage units, respectively; the energy temporary storage units are connected in parallel; the determination circuit selectively enables the active balancing circuit according to the first voltage information and the second voltage information in order to allow energy to be transmitted from the specific battery module to the energy temporary storage units through the primary side and the secondary side; and two terminals of each energy temporary storage unit are coupled to the external terminals of the whole of the set of battery modules, respectively, in order to allow the energy temporary storage units to distribute the energy temporarily stored in the energy temporary storage units to the whole of the set of battery modules.

16. The apparatus of claim 10, wherein the energy temporary storage unit comprises a capacitor, and two terminals of the capacitor are coupled to two terminals of the winding corresponding to the secondary side, respectively.

17. The apparatus of claim 10, wherein the determination circuit comprises:

a plurality of resistors, coupled to the voltage information sharing port, the resistors arranged for obtaining first voltage division information and second voltage division information from the first voltage information and the second voltage information, respectively; and at least one comparator, coupled to the resistors and the active balancing circuit, the at least one comparator arranged for comparing the first voltage division information with the second voltage division information to generate at least one comparison result;

wherein the determination circuit uses the at least one comparison result to control the at least one portion of the active balancing circuit in order to selectively enable the at least one portion of the active balancing circuit.

18. The apparatus of claim 10, wherein each battery module comprises a set of battery cells connected in series.

* * * * *